US008670553B1

(12) United States Patent
Marr et al.

(10) Patent No.: US 8,670,553 B1
(45) Date of Patent: Mar. 11, 2014

(54) REAL-TIME MONITORING OF AGENT ADHERENCE

(75) Inventors: Kenneth A. Marr, Ashland, NE (US); Joseph S. Cox, Omaha, NE (US); Maureen A. Mahoney, Omaha, NE (US); Mark D. Helm, Omaha, NE (US); Michael Joseph Parmeley, Omaha, NE (US); Brent Donald Hansen, Omaha, NE (US)

(73) Assignee: West Corporation, Omaha, NE (US)

( * ) Notice: Subject to any disclaimer, the term of this patent is extended or adjusted under 35 U.S.C. 154(b) by 1360 days.

(21) Appl. No.: 12/125,344

(22) Filed: May 22, 2008

(51) Int. Cl.
*H04M 3/00* (2006.01)
*H04M 5/00* (2006.01)

(52) U.S. Cl.
USPC .................................. 379/265.06; 379/265.03

(58) Field of Classification Search
USPC .......................................... 379/265.01–265.14
See application file for complete search history.

(56) References Cited

U.S. PATENT DOCUMENTS

| | | | | |
|---|---|---|---|---|
| 5,946,375 | A  * | 8/1999 | Pattison et al. | 379/112.01 |
| 6,587,556 | B1 * | 7/2003 | Judkins et al. | 379/219 |
| 7,636,433 | B2 * | 12/2009 | Noyan et al. | 379/265.03 |
| 8,160,233 | B2 * | 4/2012 | Keren et al. | 379/265.06 |
| 2005/0075839 | A1 * | 4/2005 | Rotheroe | 702/183 |
| 2006/0062376 | A1 * | 3/2006 | Pickford | 379/265.12 |
| 2006/0159253 | A1 * | 7/2006 | Fink et al. | 379/265.11 |
| 2006/0188085 | A1 * | 8/2006 | Ricketts | 379/265.06 |
| 2006/0256953 | A1 * | 11/2006 | Pulaski et al. | 379/265.06 |
| 2006/0271418 | A1 * | 11/2006 | Hackbarth, et al. | 705/7 |
| 2007/0206767 | A1 * | 9/2007 | Keren et al. | 379/265.01 |
| 2008/0144803 | A1 * | 6/2008 | Jaiswal et al. | 379/265.12 |
| 2009/0141868 | A1 * | 6/2009 | Miller et al. | 379/1.01 |
| 2011/0072449 | A1 * | 3/2011 | Ivanyi | 725/12 |
| 2013/0136252 | A1 * | 5/2013 | Kosiba et al. | 379/265.05 |

\* cited by examiner

*Primary Examiner* — Oleg Asanbayev

(57) ABSTRACT

A method, a system, and computer readable medium comprising instructions for real-time monitoring of agent adherence. The method comprises collecting events and data for an agent from at least one phone router, collecting time keeping data from a time clock system, collecting data and events from a scheduling system, normalizing the events, data, time keeping data and generating at least one user interface comprising normalized data, presenting at least one view of the at least one user interface to at least one application, and refreshing the at least one view with updated events and data.

17 Claims, 15 Drawing Sheets

Spectrum Realtime Adherence 1.3.5.1

| Site Name | Total Ag... | Scheduled | Clocked In | Working | Inactive | Working... | Working... | Working... | In Adhere... | Out of A... |
|---|---|---|---|---|---|---|---|---|---|---|
| Oklahoma City | 85 | 0 | 85 | 0 | 0 | 0 | 0 | 0 | 100% | 0 |
| Reno | 352 | 298 | 261 | 155 | 144 | 0 | 1 | 1 | 53.7% | 163 |
| Rocky Mount | 244 | 238 | 182 | 141 | 98 | 1 | 1 | 15 | 48.4% | 126 |
| Universal City | 407 | 400 | 279 | 208 | 197 | 5 | 5 | 11 | 44.2% | 227 |
| WAHE | 928 | 908 | 0 | 425 | 501 | 18 | 18 | 3 | 43.8% | 522 |
| College Station | 317 | 301 | 214 | 209 | 106 | 14 | 14 | 48 | 42.9% | 181 |
| Dakotah Coeur D Alen | 448 | 447 | 362 | 210 | 237 | 0 | 0 | 16 | 41.5% | 262 |
| Dakotah Holley Mason | 592 | 555 | 484 | 185 | 377 | 7 | 7 | 10 | 31.8% | 404 |
| Dakotah Pasco | 478 | 441 | 194 | 133 | 317 | 9 | 9 | 4 | 29.15% | 339 |
| Pensacola | 441 | 416 | 341 | 112 | 306 | 2 | 2 | 0 | 28.6% | 315 |
| Huntsville | 485 | 470 | 260 | 140 | 337 | 7 | 7 | 0 | 27.6% | 351 |
| Bldg 8000 | 514 | 0 | 514 | 0 | 0 | 0 | 0 | 0 | 23% | 396 |
| Omaha2 | 434 | 216 | 376 | 58 | 216 | 0 | 0 | 0 | 17.1% | 360 |
| Tulsa | 252 | 249 | 72 | 165 | 192 | 1 | 1 | 23 | 13.5% | 218 |
| Dakotah Sinto | 872 | 342 | 585 | 0 | 337 | 160 | 160 | 3 | 8.9% | 794 |
| Erie | 271 | 249 | 172 | 0 | 249 | 0 | 0 | 0 | 4.4% | 259 |
| Beaumont | 306 | 290 | 242 | 0 | 290 | 0 | 0 | 0 | 2.6% | 298 |
| Inpulse Mesa | 46 | 27 | 34 | 0 | 27 | 0 | 0 | 0 | 2.2% | 45 |
| Harlingen | 118 | 98 | 71 | 0 | 98 | 0 | 0 | 0 | 1.7% | 116 |
| Rockford | 179 | 176 | 141 | 0 | 176 | 0 | 0 | 0 | 1.1% | 177 |
| Hampton | 318 | 313 | 221 | 0 | 313 | 0 | 0 | 0 | 0.9% | 315 |
| Niles | 538 | 529 | 372 | 0 | 529 | 0 | 0 | 0 | 0.6% | 535 |

REAL-TIME MONITORING OF AGENT ADHERENCE

CROSS REFERENCE TO RELATED APPLICATIONS

The present application is related to commonly assigned U.S. patent application Ser. No. 12/125,363 entitled WORKFORCE MANAGEMENT FOR A WORK AT HOME WORKFORCE filed on even date herewith, the entire contents of which are incorporated by reference herein.

FIELD OF THE DISCLOSURE

The present disclosure relates generally to schedule adherence information. More particularly, the present disclosure provides a method, a system, and a computer readable medium comprising instructions for real-time monitoring of schedule adherence among a plurality of agents.

BACKGROUND OF THE DISCLOSURE

Historically, management of a large employee workforce has been a complex and time-consuming task. With regard to managing large groups of employees, it is often difficult to manage the schedule, phone status and time clock information of such employees. Especially in an environment where a large number of agents are employed, it is often difficult for management to determine the real-time status of the agents' schedule and time spent working on a task or on the phone.

In order to monitor schedule and time worked by the agents, the current state of art matches information from routing platforms to the schedule application and provides a view of agent statuses on the initial loading of the a Web browser. However, the presented information is not updated or refreshed once it was loaded on the Web browser. Thus, management can only identify issues associated with agent schedules and time worked in a retroactive and reactive manner. A need exists for real-time monitoring of agents' adherence to schedule and time worked, such that updated information may be delivered to management of the agents and issues may be resolved more quickly.

SUMMARY OF THE DISCLOSURE

A method, a system, and computer readable medium comprising instructions for real-time monitoring of agent adherence. In one embodiment, the method comprises collecting events and data for an agent from at least one phone call router, collecting schedule data from a scheduling system, collecting time keeping data from a time clock system, normalizing the events, data, and time keeping data, utilizing a message broker for secure information transmission over the public internet, generating at least one user interface comprising normalized data, presenting at least one view of the at least one user interface to at least one application, and refreshing the at least one view with updated events and data.

In another embodiment, the system comprises at least one phone call router comprising events and data for at least one agent, a schedule system comprising scheduling data for the at least one agent, a time clock system comprising time management information for the at least one agent, a web application server for collecting the events, data, a real-time monitoring system for normalizing the events and data and generating at least one user interface comprising normalized events and data, a message broker for secure information transmission over the public internet and presenting the normalized events and data to at least one user in the at least one user interface.

BRIEF DESCRIPTION OF THE DRAWINGS

FIG. 3 depicts a diagram illustrating a display of details for all sites in accordance with one embodiment of the present disclosure;

FIG. 6 depicts a diagram illustrating a list of agents for a particular skill in accordance with one embodiment of the present disclosure;

FIG. 9 depicts a diagram illustrating displays before and after the order of columns is rearranged in accordance with one embodiment of the present disclosure;

FIG. 12 depicts a diagram illustrating a selected agent for monitoring in accordance with one embodiment of the present disclosure;

FIG. 14 depicts a diagram illustrating a watch list in accordance with one embodiment of the present disclosure.

DETAILED DESCRIPTION OF THE INVENTION

Figure 1:
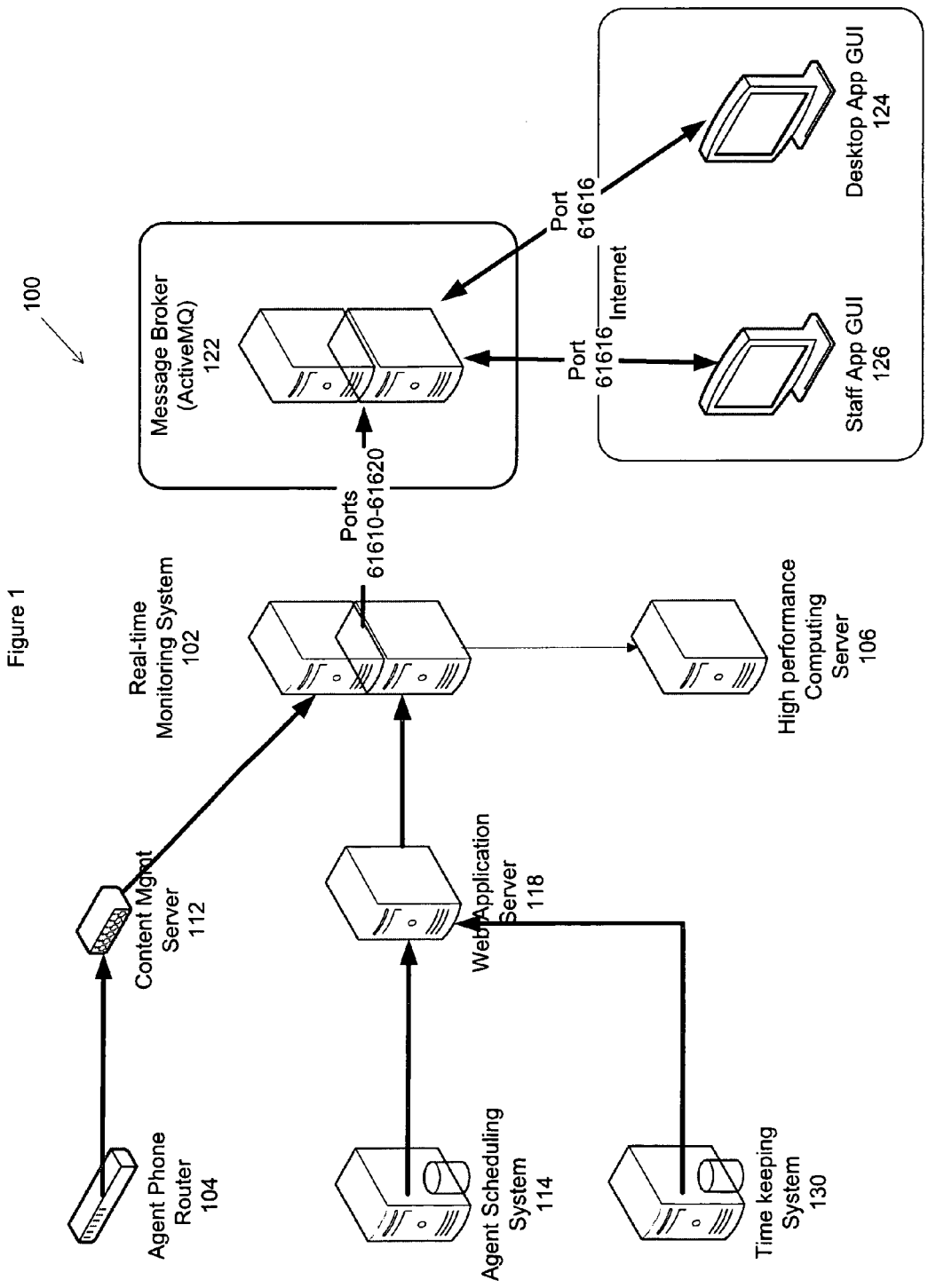
FIG. 1 depicts a diagram of a system for real-time monitoring of agent adherence in accordance with an embodiment of the disclosure.

With reference to the figures and in particular with reference to FIG. 1, a diagram of a system for real-time monitoring of agent adherence is depicted in accordance with an embodiment of the disclosure. System 100 comprises a real-time monitoring system 102 which collects data and events from multiple sources. In one embodiment, real-time monitoring system 102 collects events from multiple sources, including multiple agent phone routers 104 and the web application server 118 which collects data from the agent scheduling system 114, and timekeeping system 130.

Agent phone routers 104 provide phone states and skills of the agents to real-time monitoring system 102. An example of phone state may be whether the agent is active or inactive on the switch. Agent skill information may include the skill name that the agent is currently taking calls for. Based on the phone states and skills, content management server 112 generates reports that include a list of current states and skills of all agents who are currently on the switch. Content management server 112 also updates the list of current states every ten seconds.

Real-time monitoring system 102 also collects events from time keeping system 130 through web application server 118. Time keeping information includes clocked-in data of agents as well as lunch and break information. The time keeping data may be refreshed up to 12 times an hour. In one embodiment, the clocked-in data indicates whether an agent is clocked in or out. If the agent is clocked out, the time keeping data also indicates whether the agent is out for break, for lunch, or sick.

Agent scheduling system 114 generates agent schedules based on previously created schedules, which are fetched from the web application server 118 by real-time monitoring system 102. In one embodiment the schedule data indicates when the agent is scheduled to arrive and begin work and when they are scheduled to end work and leave.

Upon collecting events from multiple sources, real-time monitoring system 102 normalizes different formats of the data and events using a server side process. In one embodiment, the server side process may be implemented in a high performance computing server 106. However, the server side process may be implemented as process executing within the real-time monitoring system 102 without departing the spirit and scope of the present disclosure. Server side process 106 performs computations of events and data collected from the multiple sources. Real-time monitoring system 102 then supplies these events to message broker 122.

System 100 further comprises a message broker 122 that provides a view of real-time agent status to management. In one embodiment, message broker 122 provides Web user interfaces that are updated in real time with events from real-time monitoring system 102. Examples of Web user interfaces include desktop application user interface 124 and staff application user interface 126. Desktop application user interface 124 may comprise instructions independent of real-time monitoring system 102. Desktop application user interface 124 may be launched either from a link on the user's desktop or from a link in the staff application. Desktop application may comprise a set of rules for determining adherence of agents.

Systems 102, 106, 114, 118, 122, and 130 may be a data processing system, such as a desktop computer, a laptop computer, a server or any other type of device capable of sending and receive information via a wired or wireless protocol. The transfer of information or data between real-time monitoring system 102, high performance computing server 106, web application server 118, message broker 122, agent scheduling server 114, desktop application user interface 124, and staff application user interface 126 may be accomplished via at least one of a wireless protocol, a wired protocol and a combination of a wireless protocol and a wired protocol. The steps performed in this figure are performed by software, hardware, firmware, and/or the combination of software, hardware, and/or firmware.

In one embodiment, a view of real-time agent status may include headcounts, scheduled agents, clocked-in agents, and adherence state of the agents. The adherence state may be in adherence or out of adherence. In adherence means that the agent's working skills and/or clocked-in state match up to the schedule. Out of adherence means that the agent's working skills and/or clocked-in state does not match up to the schedule. There are various reasons why an agent may be out of adherence. For example, an agent may be inactive on a switch, active on the switch while he or she is not scheduled, active on the switch for a different number of skills than the ones he or she is scheduled for, and active on the switch for a wrong skill.

To determine whether an agent is in or out of adherence, real-time monitoring system 102 examines the clocked-in data from time keeping system 130 and agent schedules from the agent scheduling system 114 and determines whether the agent is clocked in to work as scheduled or clocked in to work but not scheduled. Alternatively, based on the clocked-in data and agent schedules, real-time monitoring system 102 also determines agents who are scheduled and clocked in and scheduled but not clocked in.

Figure 2:
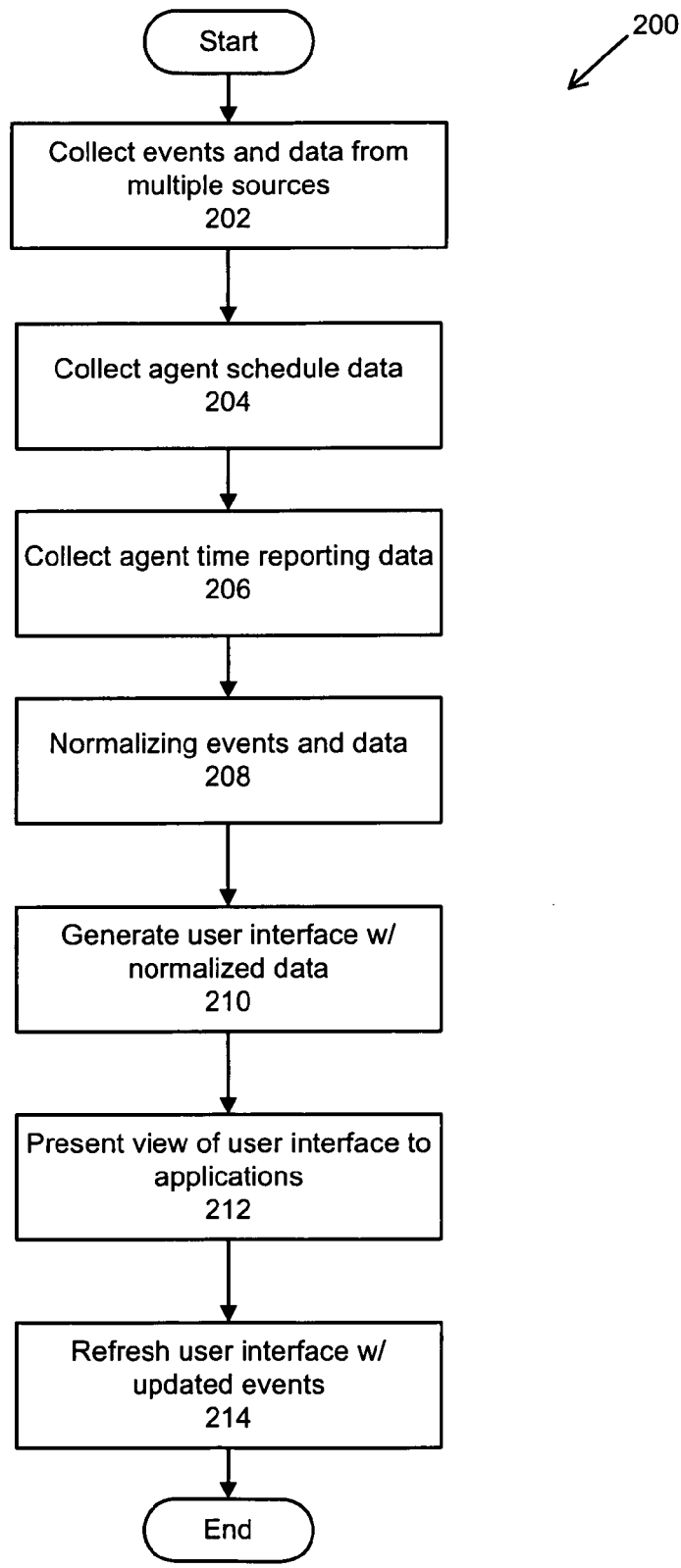
FIG. 2 depicts a flowchart of a process for real-time monitoring of agent adherence in accordance with one embodiment of the present disclosure.

Referring to FIG. 2, a flowchart of a process for real-time monitoring of agent adherence is depicted in accordance with one embodiment of the present disclosure. In one embodiment, process 200 may be implemented in a computer readable medium comprising instructions executing within real-time monitoring system 102 and Web application server 122.

Process 200 begins at step 202 to collect events and data from multiple sources, including agent phone state router 104, agent skill router 106 via content management server 112, and other routers 108 and 110. Process 200 then continues to step 204 to collect agent schedule data from the scheduling system. Process 200 then continues to step 206 to collect time reporting data from time keeping system 130. The time reporting data may be reported by agent scheduling system 114 in agent schedules 116. Process 200 then continues to step 208 to normalize the collected events and data. The normalization of events and data may be performing using a server side process in high performance computing server 106.

Process 200 then continues to step 210 to generate one or more user interface with the normalized data and events. In one embodiment, the one or more use interface may be one or more Web browser interface generated by the Web application server 122. Process 200 then continues to step 212 to present a view of user interface to one or more application. For example, Web application 122 may present a Web browser interface to staff application 126 or desktop application 124. Process 200 then completes at step 214 to refresh the user interface with updated events and data from real-time monitoring system 102. For example, real-time monitoring system 102 collects updates from multiple sources in real-time and routes new normalized data to Web application server 122. In turn, Web application server 122 generates new user interface with the new normalized data and present the user interface to the applications.

To present a view of real-time agent status to management, the user interface may comprise one or more level of displays. Each level of displays may represent a different level of details. For example, one level of displays may include details for a particular site, another level of displays may include details for skills in a particular site, another level of displays may include details for a particular agent, and another level of display for monitoring agents.

Referring to FIG. 3, a diagram illustrating a display of details for all sites is depicted in accordance with one embodiment of the present disclosure. In one embodiment, display 300 may be implemented as a user interface executing within desktop application 124 when a manager launches desktop application 124 on the desktop. Also in one embodiment, the desktop application 124 may be executed on a Java® 1.6 runtime environment. Java® 1.6 runtime environment is a product from Sun Microsystems, Inc.

In display 300, a list of sites is presented in both a drop down list 301 and in column 302. For each site in the list of sites 302, a number of details are displayed. The details include the number of total agents 304, the number of agents scheduled 306, the number of agents clocked in 308, the number of agents currently working 310, the number of agents inactive on the switch 312, the number of agents who are working but not scheduled 314, the number of agents who are working the wrong skill 316, the adherence percentage 320, and the number of agents who are out of adherence 322.

The number of total agent 304 is the total number of unique agents for each site from the switch, schedules, and time clock information. The number of agents scheduled 306 is the total number of active schedules from the agent time reporting server. The number of agents clocked in 308 is the total number of agents clocked in to the time keeping system 130. The number of agents currently working 310 is the total number of agents on the switch for that site.

The number of agents inactive on the switch 312 includes agents who are scheduled for a skill but have not been active on the switch. The number of agents who are working but not scheduled 314 includes agents who are not scheduled by are active on the switch. The number of agents who are working the wrong skill 316 is determined by comparing the skill names that agents are active on the switch for to the skill names they are scheduled for.

The adherence percentage 320 is calculated based on the number of agents in adherence over the number of total agents 304. In order to determine the number of agents in adherence, the number of agents out of adherence 322 is subtracted from the number of total agents 304.

Figure 4:
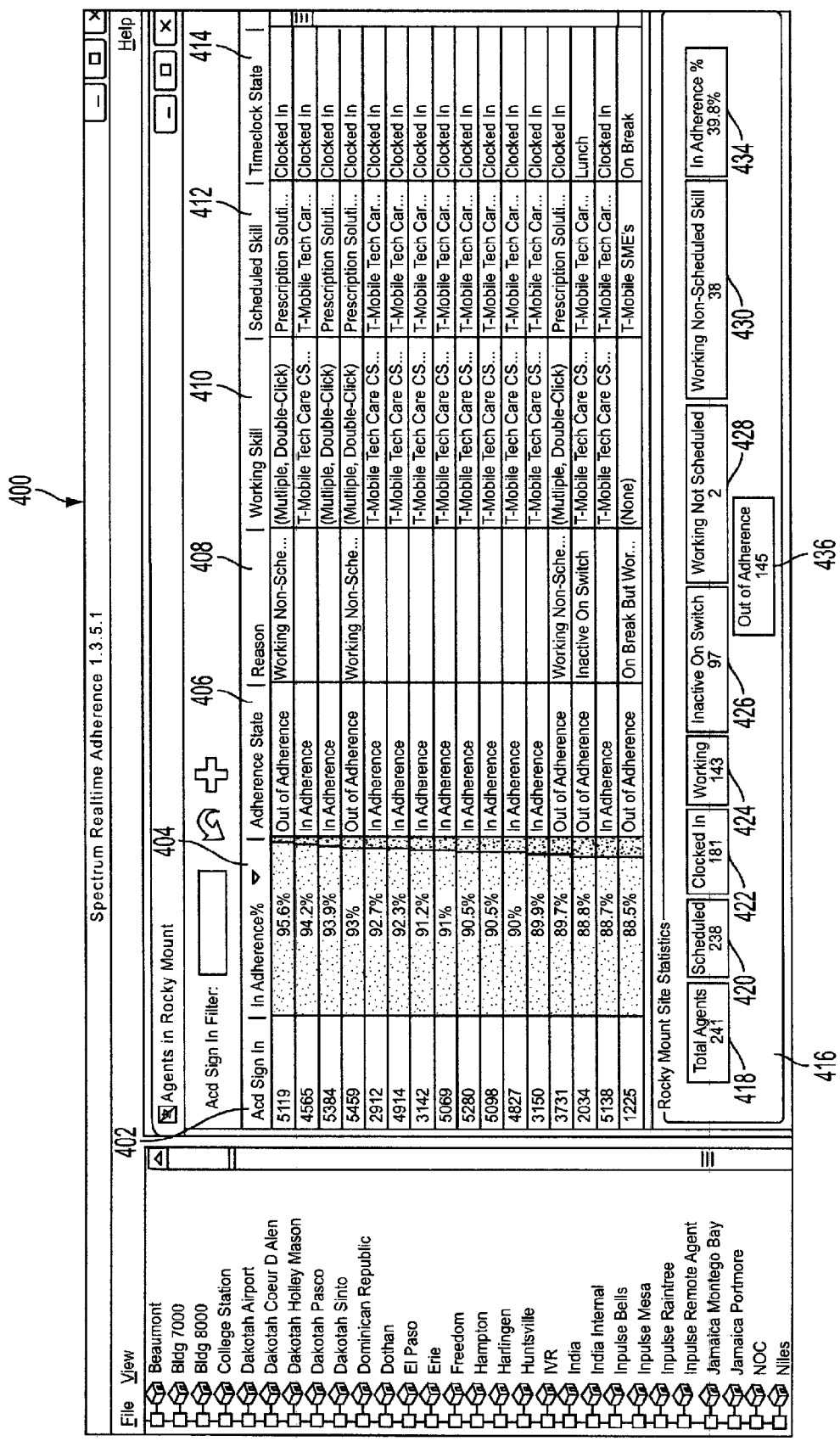
FIG. 4 depicts a diagram illustrating a display of details for a particular site in accordance with one embodiment of the present disclosure.

If the user selects one of the sites from drop down list 301 or the list of sites 302, a display of details for the particular site is displayed. Referring to FIG. 4, a diagram illustrating a display of details for a particular site is depicted in accordance with one embodiment of the present disclosure.

Display 400 comprises details for all agents who are working for a particular site. A list of agents for this site is displayed in column 402. In addition, display 400 comprises details for each agent in the list of agents 302. These details include the percentage of adherence 404, the current adherence state 406, the reason for not being in adherence 408, the working skill of the agent 410, the scheduled skill of the agent 412, and the time clock state of the agent 414.

The reason for not being in adherence 408 may provide a user the ability to quickly tell what the agent is doing that is incorrect. The working skill 410 is a skill name obtained from agent skill phone call router 104. The scheduled skill 412 is a skill name obtained from the scheduling system. The time clock state of the agent 414 is the clock state from time keeping system 130.

In addition to details for each agent of the site, display 400 comprises real-time statistics for each site 416. These statistics 416 include the number of total agents 418, the number of agents scheduled 420, the number of agents clocked-in 422, the number of working agents 424, the number of agents who are inactive on the switch 426, the number of agents who are working but not scheduled 428, the number of agents who are working the wrong skill 430, the percentage of in adherence 434, and the number of agents out of adherence 436.

Figure 5:
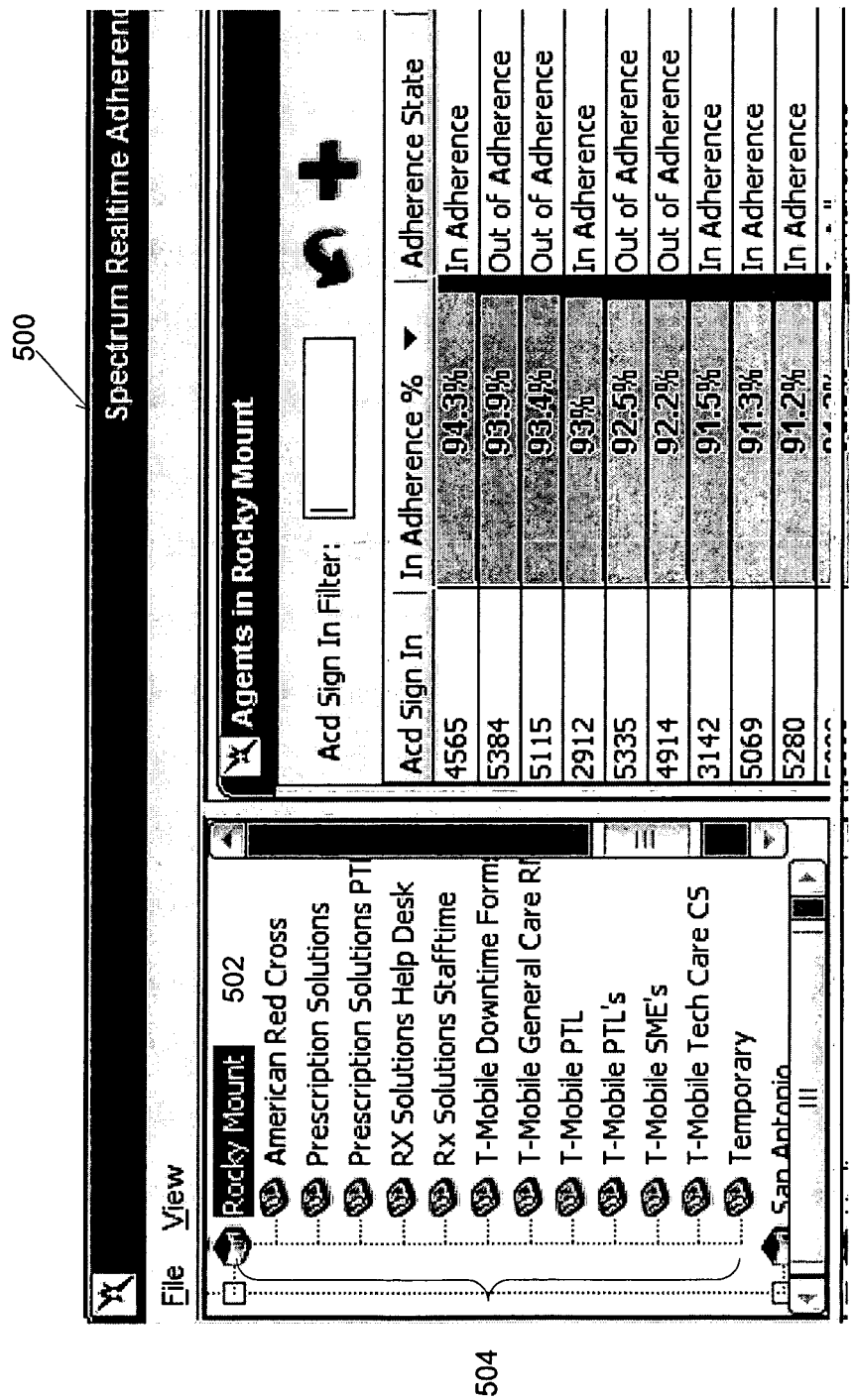
FIG. 5 depicts a diagram illustrating a list of skills for a particular site in accordance with one embodiment of the present disclosure.

Referring to FIG. 5, a diagram illustrating a list of skills for a particular site is depicted in accordance with one embodiment of the present disclosure. Display 500 is similar to display 400 except that when a user clicks on a particular site from drop down list 301 or double clicks a site from a list of sites 502, a list of skills 504 for that site is displayed.

Figure 6:
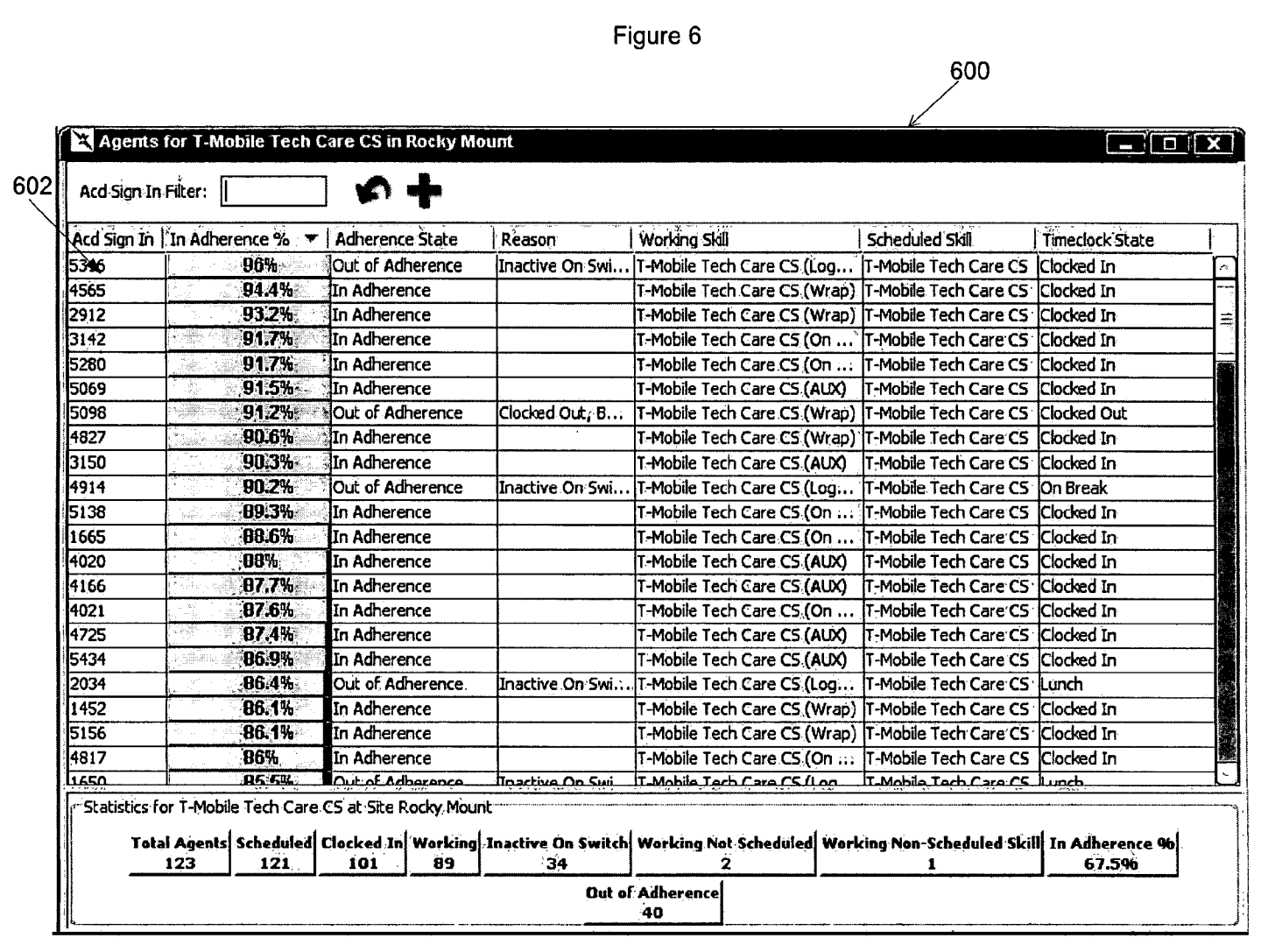

Referring to FIG. 6, a diagram illustrating a list of agents for a particular skill is depicted in accordance with one embodiment of the present disclosure. Display 600 is similar to display 400 except that the list of agents 602 is for a particular skill. For each of the agents, details of their skills are displayed. These details include the adherence state, which is whether the agent is in adherence or out of adherence. The details also include reasons for being out of adherence, including the number of agents inactive on the switch, working but not scheduled, working and schedule mismatch, working the wrong skill, clocked in but not working and not scheduled, on break but working, at lunch but working and clocked out but scheduled and working. The details further comprise the percentage of adherence, the working skill, the scheduled skill, and the clocked in state.

The clocked in but not working and not scheduled includes agents who are clocked in according to the time keeping system but are not active on the switch or on the schedule. On break but working includes agents who are on break but are active on the switch. At lunch but working includes agent who are on lunch but are active on the switch. Clocked out but scheduled and working includes agents who are clocked out but are active on the switch and have an active schedule.

Figure 7:
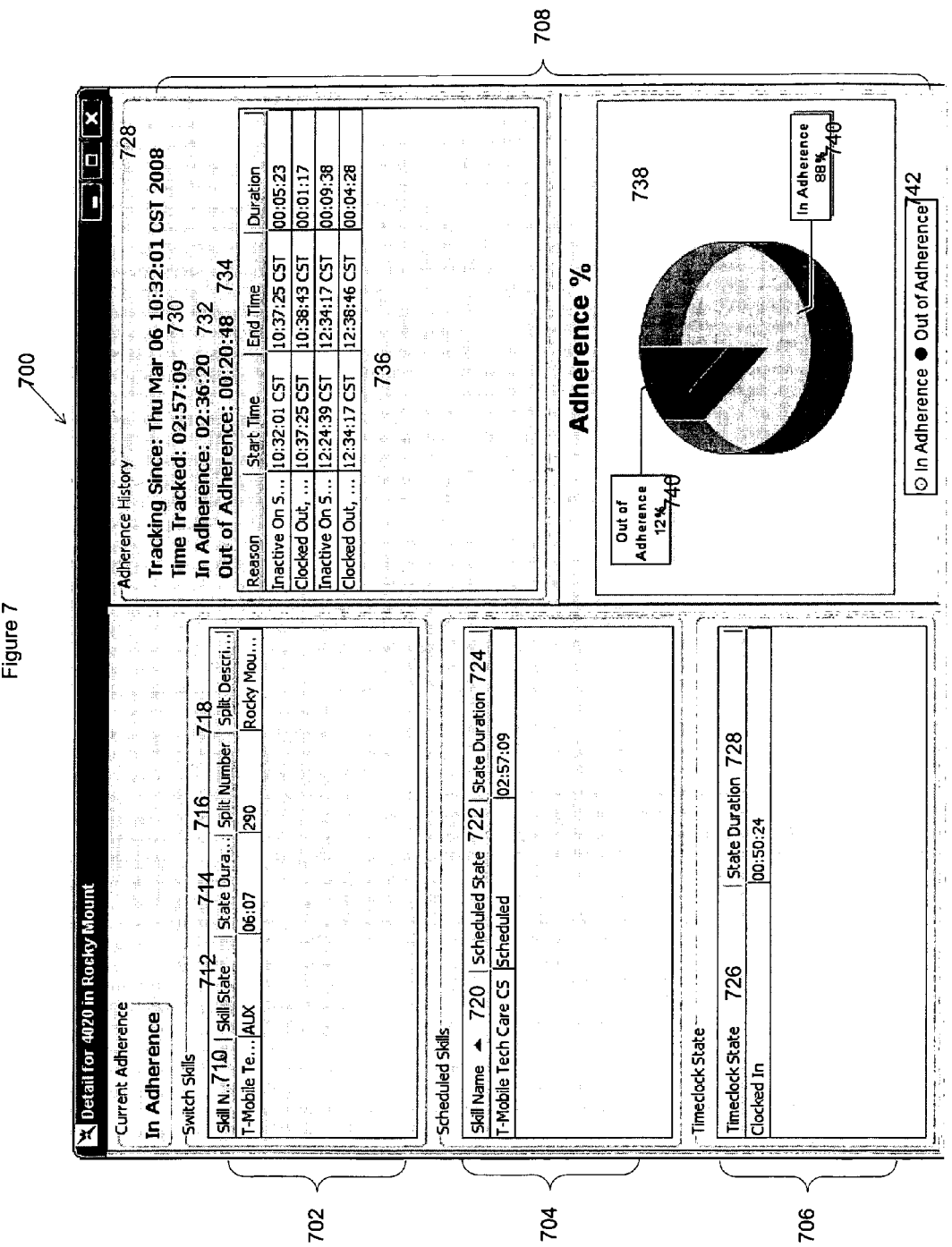
FIG. 7 depicts a diagram illustrating a list of details for a particular agent in accordance with one embodiment of the present disclosure.

Referring to FIG. 7, a diagram illustrating a list of details for a particular agent is depicted in accordance with one embodiment of the present disclosure. When the user selects an agent from a list of agents 602 or 402, a display 700 of details for the selected agent is displayed. Display 700 comprises details for a particular agent. In this example, the details include switch skills 702, scheduled skills 704, time clock state 706, and adherence history 708.

Switch skills 702 include skill name 710, skill state 712, state duration 714, split number 716, and split description 718. Skill name 710 is the name of the skill from the switch. Skill state 712 is the status of the agent on the switch, which may be logged out, on call, busy other, wrap, waiting, and not ready. State Duration 714 is the amount of time that the agent has spent in that state. Split number 716 is the split number from the switch. This number may be useful to any user in network control. Split description 718 is the description of the split number. This description may be useful to any user in network control.

Scheduled skills 704 include skill name 720, scheduled state 722, and state duration 724. The skill name 720 describes the name of the skill from the scheduling system. The scheduled state 722 may either be scheduled or not scheduled. State duration 724 is the amount of time the agent has spent in that schedule duration.

Time clock state 706 includes time clock status 726, and state duration 728. The timeclock state 726 indicates the agent's current status on the timekeeping system. State Duration 728 is the amount of time that the agent has spent in that timeclock state. The time clock may be obtained from the agent's system and the time clock information may be updated twelve times an hour. The time clock state 728 may be clocked in, clocked out, and lunch and break.

Adherence history 708 include the agent's tracking since 728, time tracked 730, in adherence 732, and out of adherence 734. Tracking since 728 indicates the date and time the system began tracking or when the agent became active on the switch, scheduled or clocked in. Time tracked 730 indicates the amount of time the agent has been tracked. In adherence 732 indicates the amount of time the agent has been in adherence. Out of adherence 734 indicates the amount of time the agent has been out of adherence.

In addition, adherence history 708 includes reasons 736 for being out of adherence, which may include inactive on the switch, working but not scheduled and working the wrong skill. For each of these reasons, a start time, an end time, and the duration of time the agent was out of adherence for the reason listed are also displayed.

Adherence history 708 also includes adherence % 738. Adherence % is a graphical display of the amount of time tracked separated in a pie-chart format into the amount of time out of adherence and amount of time in adherence. This includes labels 740 and a key 742.

Figure 8:
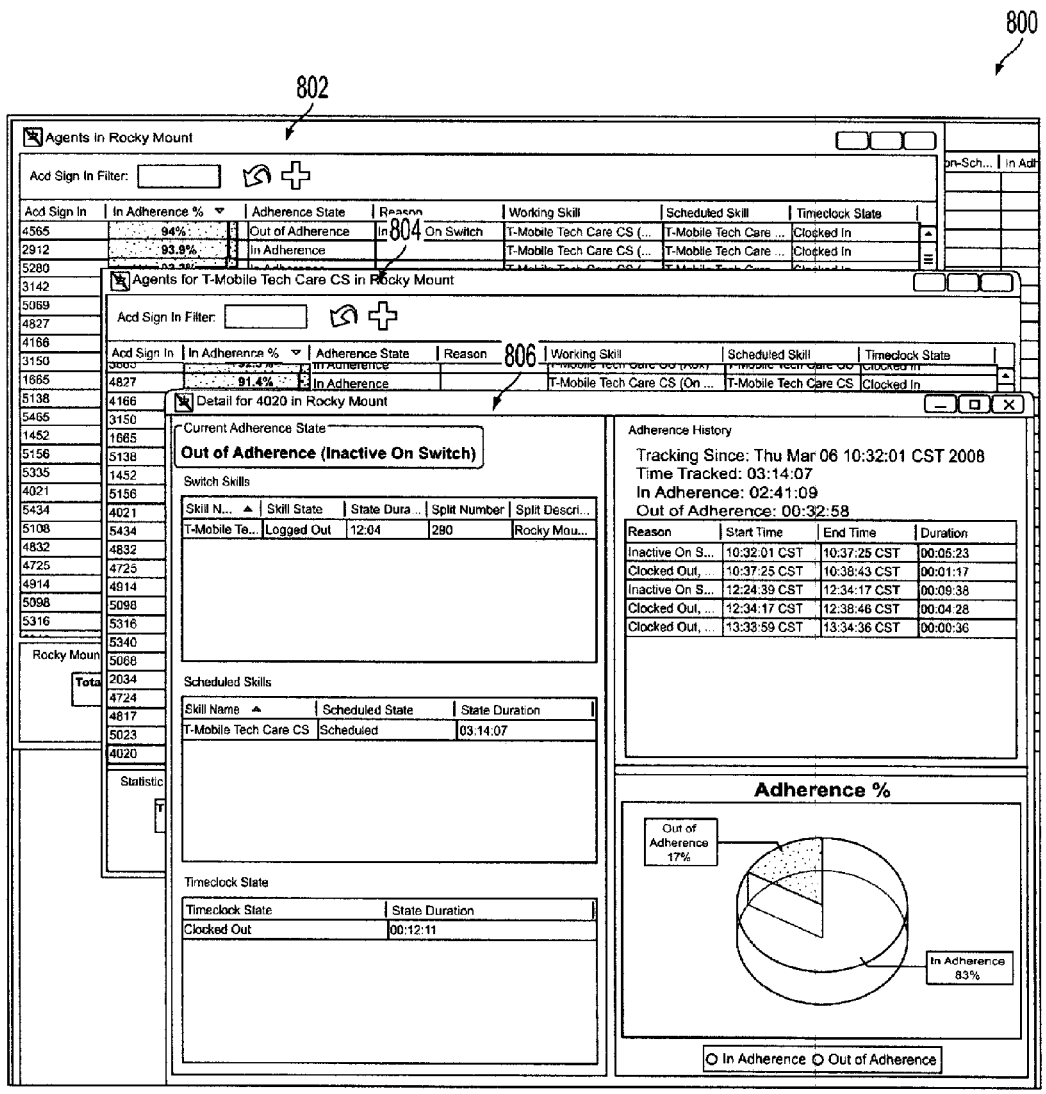
FIG. 8 depicts a diagram illustrating a display comprising multiple sites, skills and agent details in accordance with one embodiment of the present disclosure.

In addition to displaying a view of details for a particular site, an agent, or a skill to management, multiple sites or skills may be displayed at one time by selecting each site or skill individually. Referring to FIG. 8, a diagram illustrating a display comprising a site view, a skill view agent details is depicted in accordance with one embodiment of the present disclosure. Display 800 comprises details for one site 802, details for a skill 804, and details for a particular agent 806.

In any of the displays described above, sorting of data in each column may be performed by clicking on the header row of each column. For example, to sort the percentage of adherence for a list of agents, the user may click on the header row "adherence %" to view a sorted list.

Figure 9:
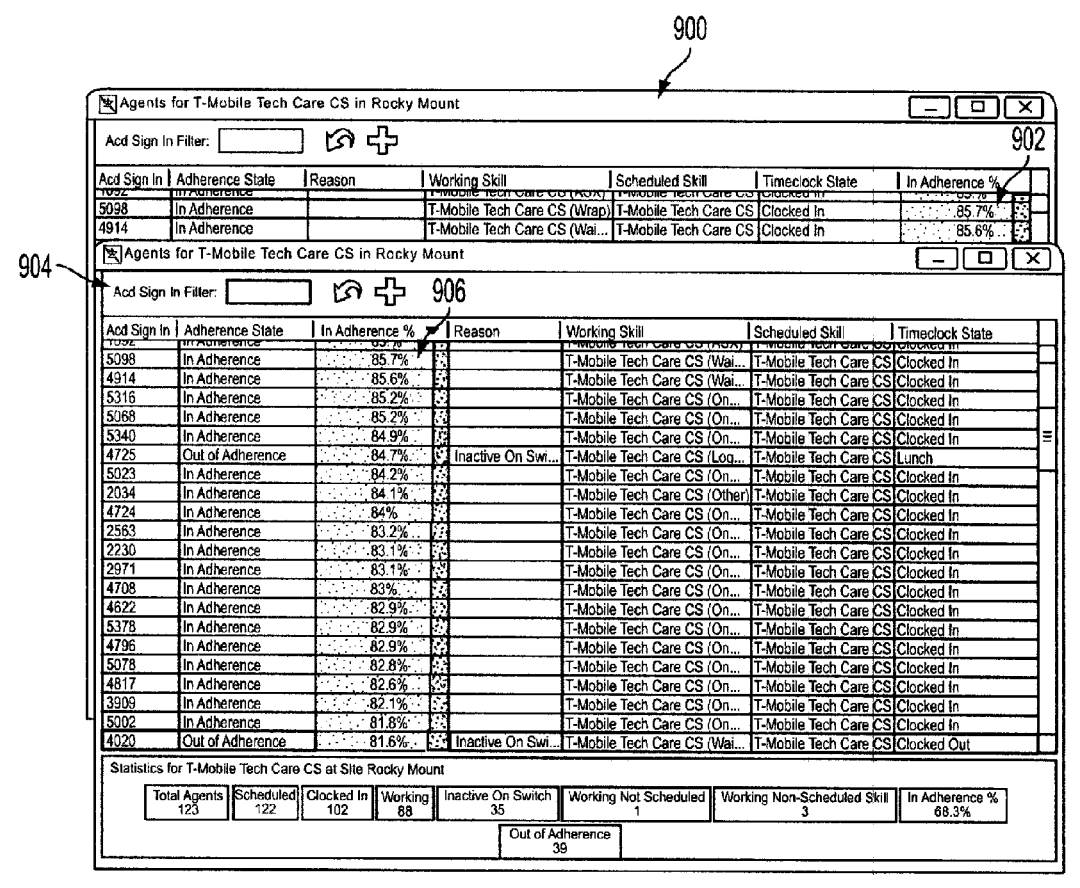

Also, in any of the displays described above, the order of columns in each display may be rearranged. Referring to FIG. 9, a diagram illustrating displays before and after the order of columns is rearranged is depicted in accordance with one embodiment of the present disclosure. Display 900 comprises details for a particular skill. A user may decide to rearrange the in adherence % column 902 in display 900. The user may click on in adherence % column 902 and drag the column to a different order. In this example, the in adherence % column 902 is rearranged from the sixth column to the third column 906 as illustrated in display 904.

Figure 10:
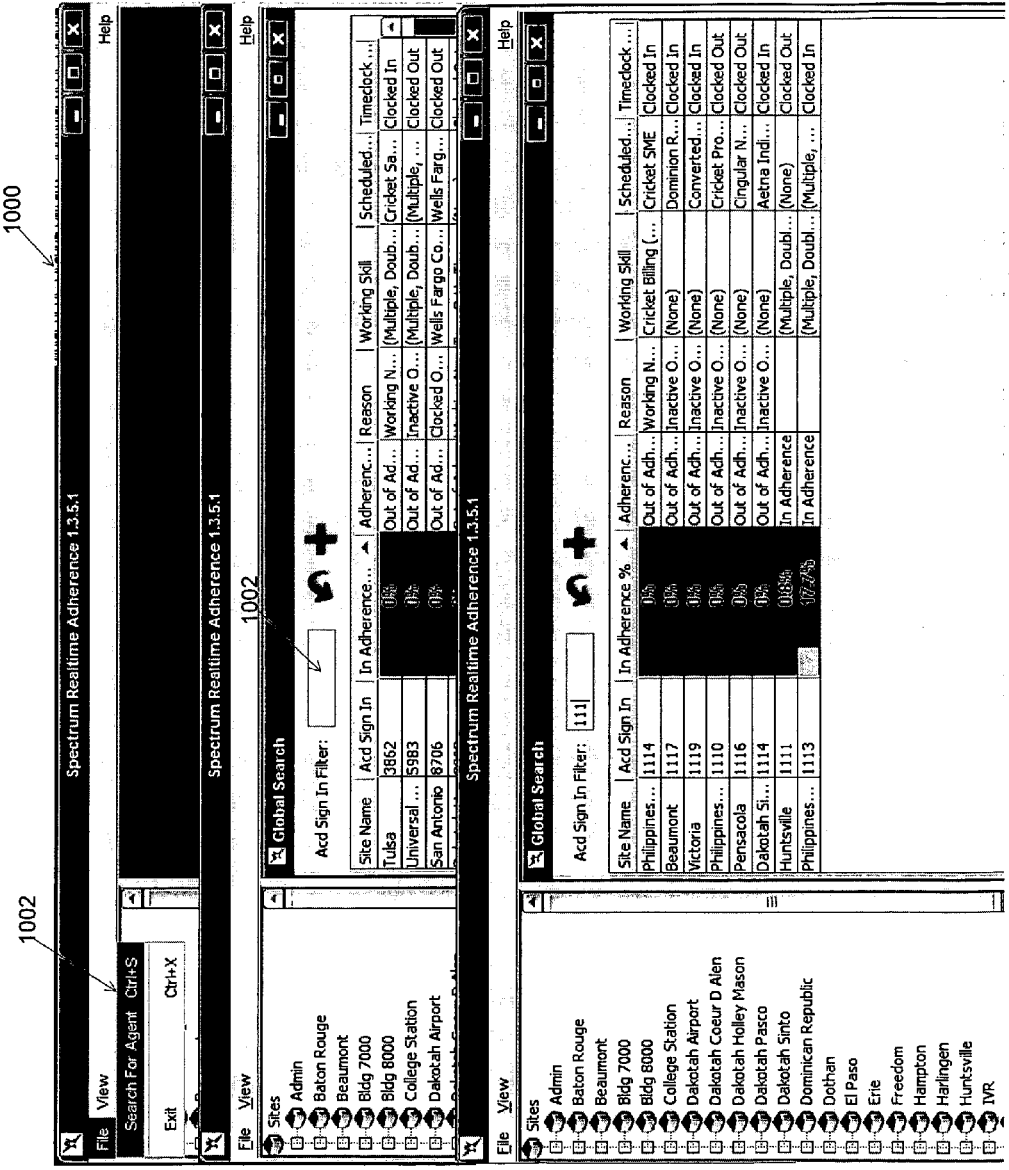
FIG. 10 depicts a diagram illustrating a display to launch an agent search across all sites in accordance with one embodiment of the present disclosure.

Another aspect of the desktop application 124 includes providing management the ability to locate and monitor agents. Referring to FIG. 10, a diagram illustrating a display to launch an agent search across all sites is depicted in accordance with one embodiment of the present disclosure. To launch a global search, a user may select the file menu in display 1000 and search for agent option 1002 from the file menu or use the keyboard shortcut of CTRL+S. A global search of agent across all sites may be performed once the user enters an agent number into an agent sign in filter field 1002.

Figure 11:
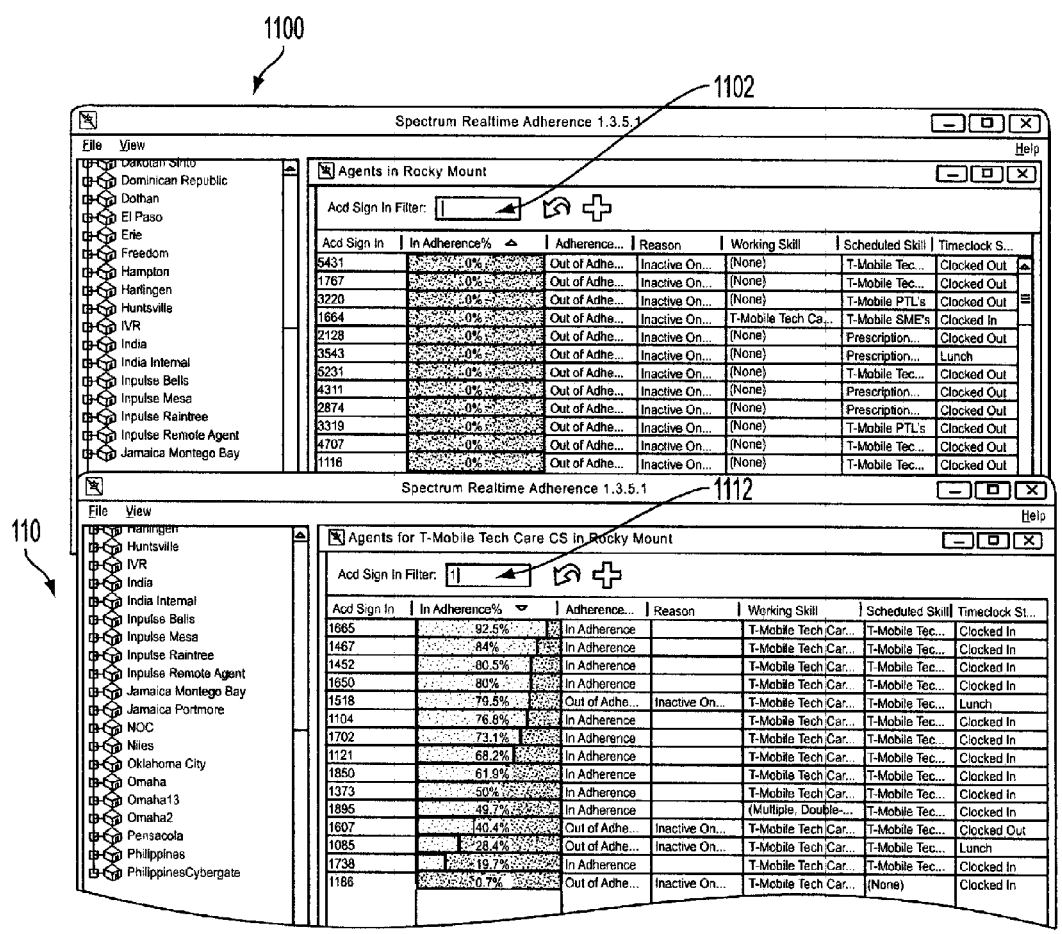
FIG. 11 depicts a diagram illustrating a display to launch an agent search for a particular site or skill in accordance with one embodiment of the present disclosure.

In addition to an agent search across all sites, an agent search may be performed for a specific site or skill. Referring to FIG. 11, a diagram illustrating a display to launch an agent search for a particular site or skill is depicted in accordance with one embodiment of the present disclosure. Display 1100 includes details for a particular site, in this example, Rocky Mount. A user may perform an agent search for this particular site by entering an agent number into the agent sign in filter field 1102. Similarly, display 1110 includes details for a particular skill, in this case T-Mobile Tech Care CS. A user may perform an agent search for this particular skill by entering an agent number into the agent sign in field 1112.

Figure 12:
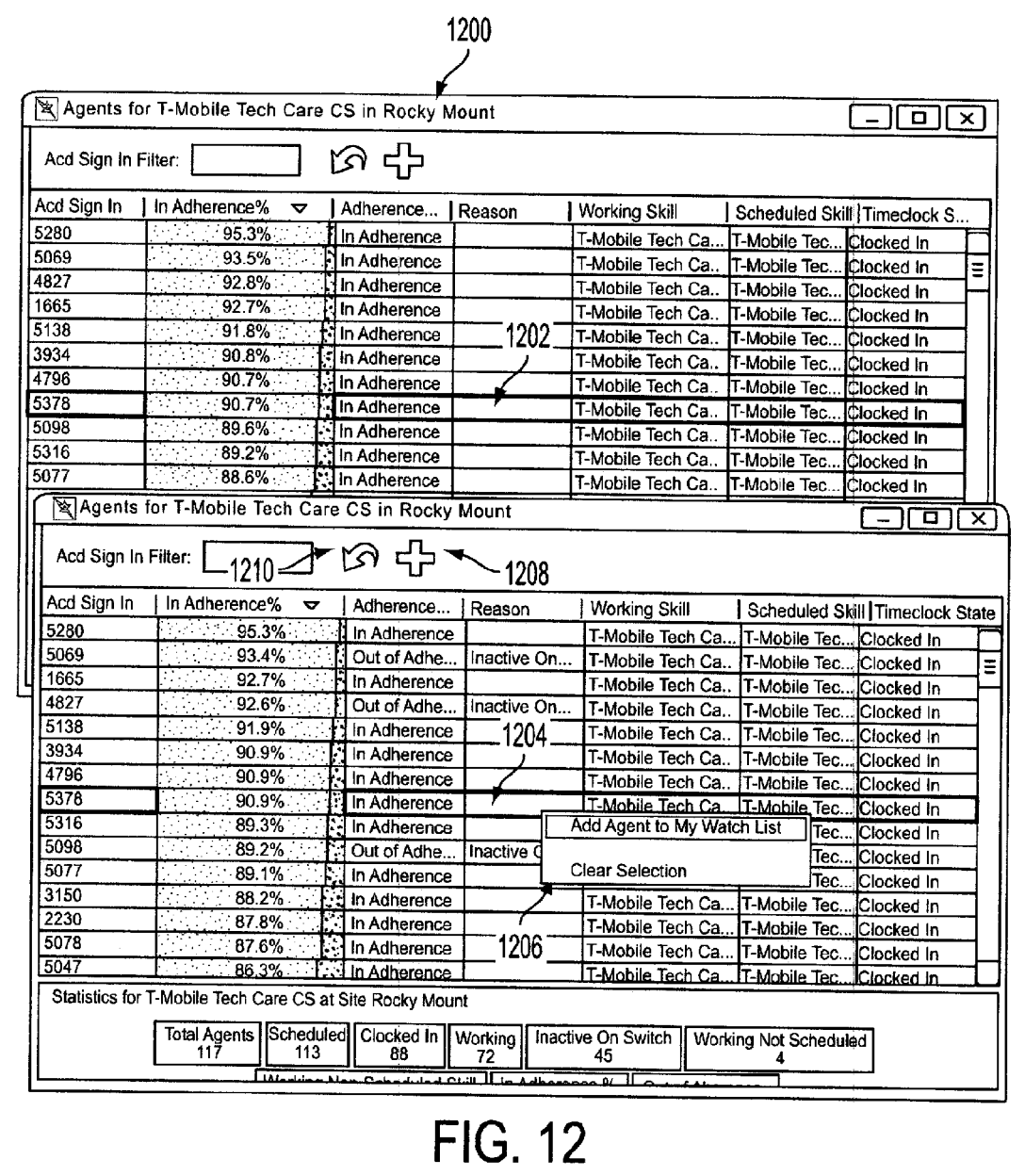

Because the displays are continuously refreshed by real-time monitoring system as new events and data are processed, a user may keep monitoring the status of the agent by selecting the agent. Referring to FIG. 12, a diagram illustrating a selected agent for monitoring is depicted in accordance with one embodiment of the present disclosure. To select an agent for monitoring, a user may highlight the agent row to keep that agent in front view as the system updates and sorts the data by state. In display 1200, a user may select the agent by highlighting the agent row 1202. The user may then right click the selected row and select "add agent to my watch list" 1204 to add that agent for monitoring. To deselect an agent from monitoring, the user may right click on the selected row and select "clear selected row" 1206 to remove the agent from highlighting.

Additionally a user may add an agent to the watch list using the add agent to my watch list button 1208, or clear the row with the row selected row button 1210. The add agent to watch list 1208 appears when a row is highlighted, depression of the button adds the selected agent to the watch list. The row clear button 1210 deselects the row.

Figure 13:
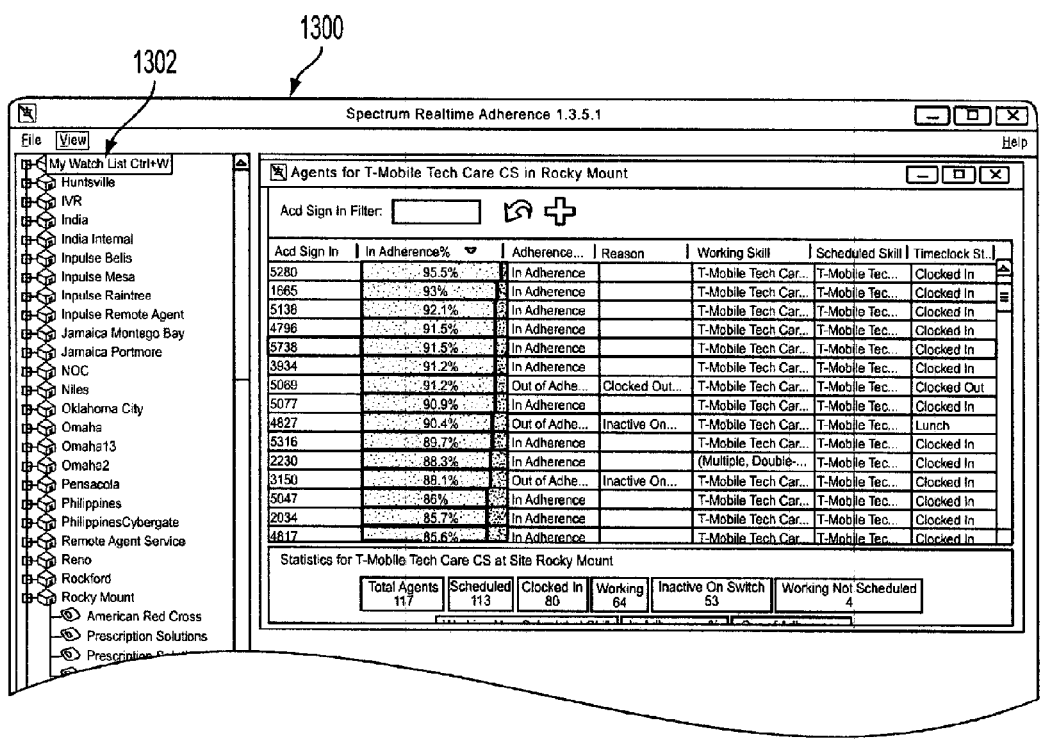
FIG. 13 depicts a diagram illustrating a selection to view a watch list in accordance with one embodiment of the present disclosure.

Once agents are added to the watch list, a user may view the list of watched agents by customizing a view. Referring to FIG. 13, a diagram illustrating a selection to view a watch list is depicted in accordance with one embodiment of the present disclosure. To view agents who have been added to the watch list, a user may select a view menu in display 1300 and "my watch list" option 1302 from the view menu, or use the keyboard shortcut CTRL-W.

Figure 14:
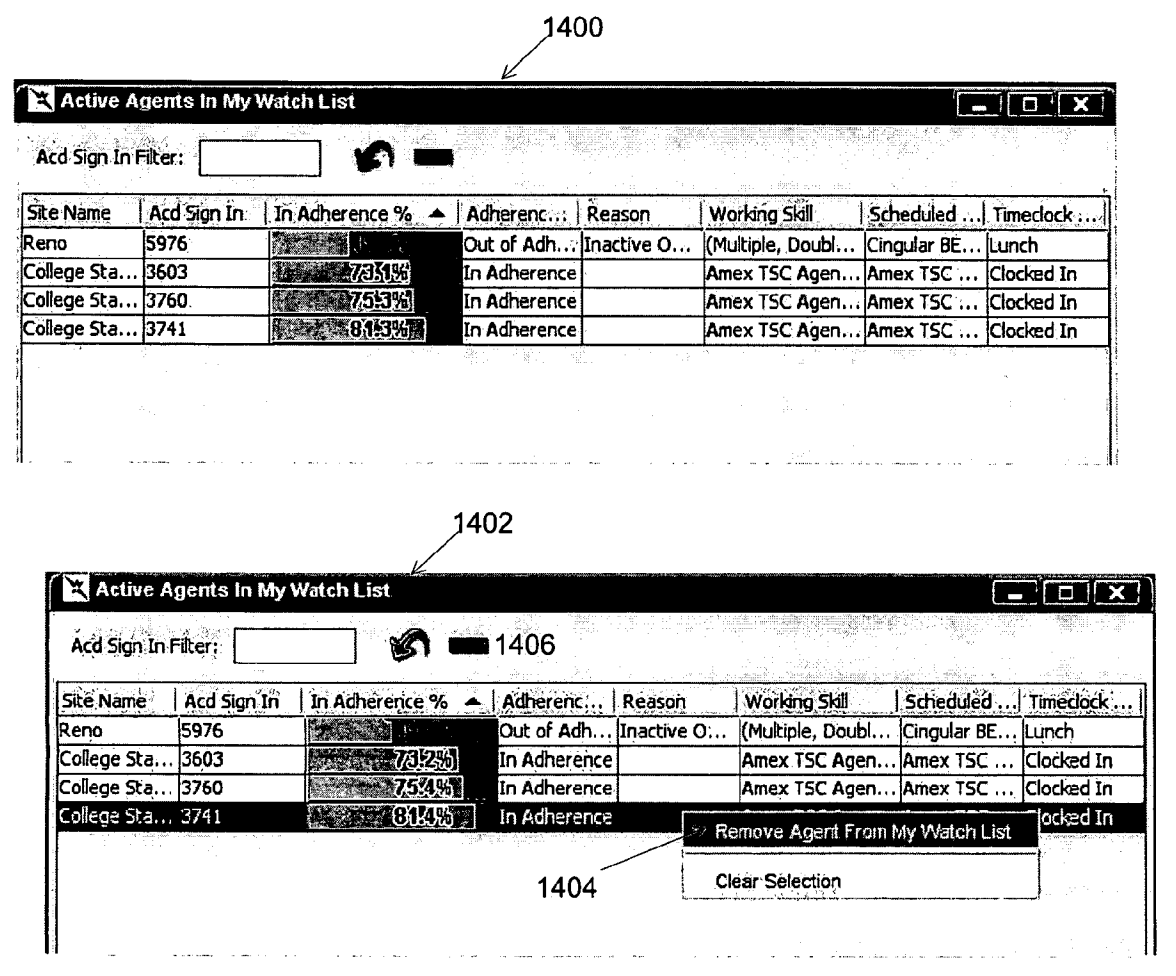

Upon selection of the "my watch list" option 1302, a display comprising agents in the watch list is displayed. Referring to FIG. 14, a diagram illustrating a watch list is depicted in accordance with one embodiment of the present disclosure. Display 1400 comprises all active agents that are added to the watch list. In this example, agents 4976, 3603, 3760 and 3741 have been added to the watch list. By providing the ability to monitor agents in a watch list, agents that have a history of out of adherence may be monitored. The watch list may be saved for different users. Thus, the watch list may be retrieved and displayed to any user the next time the user logs on to the application.

The list of agents in a watch list will remain on the list until the user removes them. To remove an agent from the watch list, the user may select the agent to be removed and right click on the agent row. The user may then select "remove agent from my watchlist" to remove the selected agent. For example, in display 1402, the user may select agent number 4742 to be removed. Then the user may right click on the agent row and select "remove agent from my watch list" 1404 to remove agent number 4742 from the watch list. A user can also use the "remove agent from my watch list" button 1406.

Figure 15:
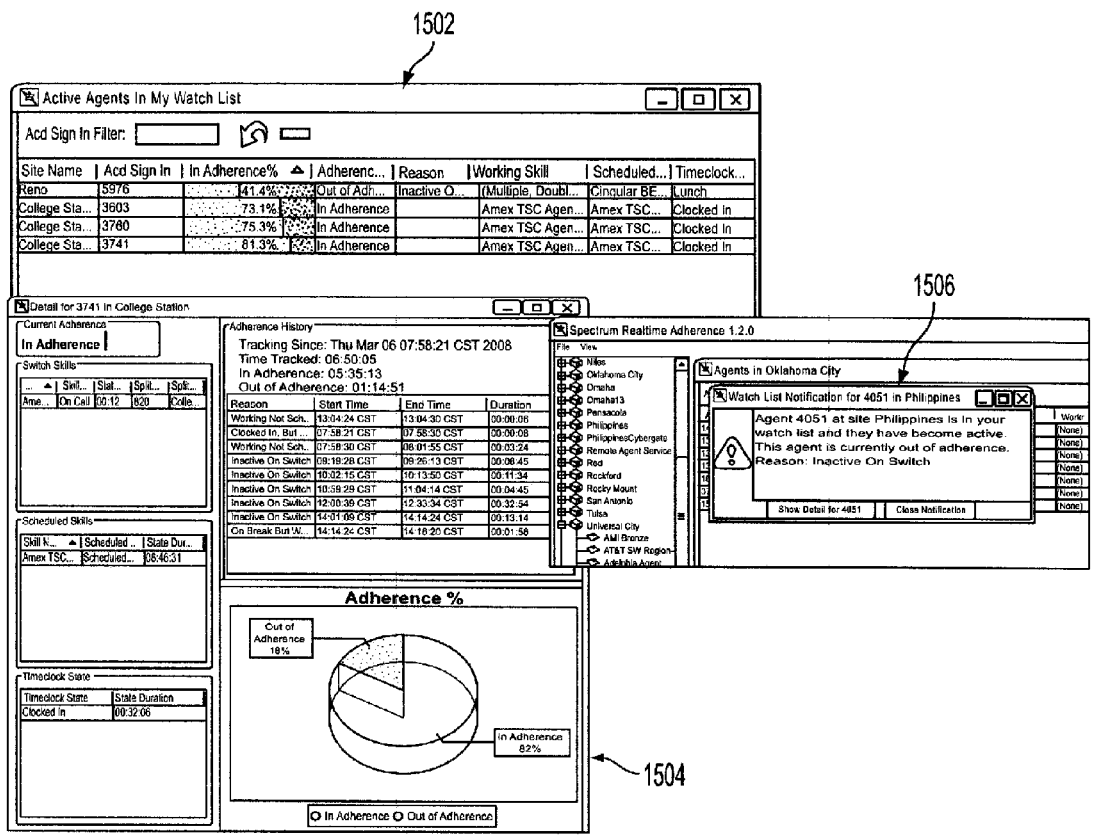
FIG. 15 depicts a diagram illustrating details of an agent in the watch list and agent notification in accordance with one embodiment of the present disclosure.

If the user wants to view details for an agent in the watch list, the user may double click on the agent to view the details. Referring to FIG. 15, a diagram illustrating details of an agent in the watch list and agent notification is depicted in accordance with one embodiment of the present disclosure. A user may view details of an agent in the watch list by double clicking an agent from the list. In this example, agent number 3741 is added to watch list in display 1502. By double clicking agent number 3741 in display 1502, a display of details is displayed. If the agent becomes active, a notification 1506 may be displayed notifying the user that the agent in the watch list has become active. In addition, the notification 1506 may notify the user that the agent is currently out of adherence and the reason for being out of adherence, in this example, inactive on switch. Notification 1506 also provides options for the user to close the notification or to show the details of the agent.

In summary, the present disclosure provides real-time monitoring of agent adherence to a work schedule. Data and events, including events from call router, time clock information and schedule events, are collected from multiple sources and normalized using a server side process. A view of details for sites, skills, and agents are provided to management via a Web user interface and refreshed at real time to provide updated schedule adherence information.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A method for real-time monitoring and reporting of agent status, the method comprising:

collecting, by a web application server of a real-time monitoring system, events and data for an agent from a scheduling system;

collecting, by a server of the real-time monitoring system, events and data for the agent from at least one phone router wherein the at least one phone router comprises a phone skill name that the agent is currently taking calls for and comprises a state of the agent's phone at that time, the state of the agent's phone comprising active or inactive on the at least one phone router, the phone skill name comprising a skill name the agent is currently working;

collecting, by the web application server of the real-time monitoring system, time keeping events and data from a time keeping system, the time keeping data comprising clocked-in time, clocked-out time, lunch time and break time, the time keeping events comprising whether the agent is out on break, on lunch or sick;

normalizing the events, data, the time keeping data and generating normalized data and at least one user interface comprising the normalized data, by a server side process of the real-time monitoring system;

wherein the at least one user interface is one of a staff application user interface and a desktop application user interface;

providing the normalized data to a message broker of the real-time monitoring system;

presenting, by the message broker, at least one view of the at least one user interface to one of the staff application user interface and the desktop application user interface;

wherein the at least one view comprises: at least one level of display, wherein the at least one level of display includes a display of details across a plurality of sites, a display of details for a particular site, a display of details for a particular skill, and a display of details for a particular agent;

wherein the display of details for the particular site comprises details of at least one agent in the particular site, wherein the details comprises an adherence percentage, a reason for not being in adherence, a working skill of the at least one agent, a scheduled skill of the at least one agent, a time clock state of the at least one agent, real-time statistics for the particular site, the real-time statistics comprise a number of total agents, a number of agents scheduled, a number of agents clocked-in, a number of working agents, a number of agents who are inactive on a switch, a number of agents who are working but not scheduled, a number of agents who are working a wrong skill, a percentage of agents in adherence, and a number of agents out of adherence;

wherein the display of details for the particular skill of the at least one agent comprises details of the at least one agent for the particular skill, and wherein the details comprise an adherence state, a reason for being out of adherence, an adherence percentage, a working skill, a scheduled skill, and a clocked in state;

wherein the reason for being out of adherence comprises a number of agents inactive on the switch, working but not scheduled, working and schedule mismatch, working the wrong skill, clocked in but not working and not scheduled, on break but working, at lunch but working and clocked out but scheduled; and refreshing the at least one view with updated events and data wherein refreshing comprises periodically fetching the events and data from the phone router, including a change to at least one of the phone skill name that the agent is currently taking calls for and a change to the phone state of the agent;

wherein refreshing the at least one view with the updated events and data further comprises: fetching the time keeping data from the time keeping system twelve times an hour; and fetching the events and data from the scheduling system and the at least one phone router four times an hour.

2. The method of claim 1, wherein the at least one phone router comprises an agent phone state and a phone skill that the agent is currently taking calls for; wherein the agent phone state is also referred to as a working skill and wherein the phone skill that the agent is currently scheduled to take calls for is also referred to as a scheduled skill.

3. The method of claim 1, wherein the scheduling system generates at least one schedule for the agent.

4. The method of claim 1, wherein normalizing the events, data, the time keeping data comprises: computing the event, data, and the time keeping data in a high performance computing server.

5. The method of claim 2, wherein the agent phone router provides a skill name that the agent is currently talking calls for and the state of the agent's phone at that time non-adherence by the agent is indicated when the working skill differs from the scheduled skill.

6. The method of claim 1, wherein a display of details across a plurality of sites comprises details for at least one of the plurality of sites, and wherein the details comprises a number of total agents, a number of agents scheduled, a number of agents clocked in, a number of agents currently working, a number of agents inactive on the switch, a number of agents who are working but not scheduled, a number of agents who are working wrong skill, a adherence percentage, and the number of agents who are out of adherence.

7. The method of claim 6, wherein the adherence percentage is calculated by dividing the number of agents who are in adherence over the number of total agents and multiplying the result by 100.

8. The method of claim 7, wherein the number of agents who are in adherence is calculated by subtracting the number of agents who are out of adherence from the number of total agents.

9. The method of claim 1, wherein the display of details for the particular agent comprises working switch skills of the particular agent, scheduled skills of the particular agent, current time clock state of the particular agent, and adherence history of the particular agent.

10. The method of claim 9, wherein the adherence history comprises time from which tracking began, the total amount of time the particular agent is being tracked, amount of time in adherence, amount of time out of adherence, a reason for being out of adherence and a graphical display of the adherence percentage.

11. The method of claim 1, further comprises: locating and monitoring the at least one agent.

12. The method of claim 11, wherein locating the at least one agent comprises performing a search for the at least one agent across a plurality of sites, in a particular site, or for a particular skill.

13. The method of claim 11, wherein monitoring the at least one agent comprises: adding the at least one agent to a watch list; selecting an agent from the at least one agent; and viewing details of the selected agent in the at least one view.

14. The method of claim 13, wherein monitoring the at least one agent further comprises: notifying at least one user in response to the at least one agent in the watch list one of initially becoming active on the switch, initially being scheduled, and exhibiting an initial time clock state other than Logged Out.

15. A system for real-time monitoring of agent adherence comprising:
   a web application server, collecting events and data for an agent from a scheduling system; the web application server, collecting time keeping events and time keeping data from a time keeping system, the time keeping data comprising clocked-in time, clocked-out time, lunch time and break time, the time keeping events comprising whether the agent is out on break, on lunch or sick;
   a server, collecting events and data for the agent from at least one phone router wherein the at least one phone router comprises a phone skill name that the agent is currently taking calls for and comprises a state of the agent's phone at that time, the state of the agent's phone comprising active or inactive on the at least one phone router, the phone skill name comprising a skill name the agent is currently working;
   a high performance computing system, normalizing the events, data, the time keeping data and generating normalized data and at least one user interface comprising the normalized data;
   wherein the at least one user interface is one of a staff application user interface and a desktop application user interface;
   providing the normalized data to a message broker;
   the message broker, presenting at least one view of the at least one user interface to one of the staff application user interface and the desktop application user interface;
   wherein the at least one view comprises: at least one level of display, wherein the at least one level of display includes a display of details across a plurality of sites, a display of details for a particular site, a display of details for a particular skill, and a display of details for a particular agent;
   wherein the display of details for the particular site comprises details of at least one agent in the particular site, wherein the details comprises an adherence percentage, a reason for not being in adherence, a working skill of the at least one agent, a scheduled skill of the at least one agent, a time clock state of the at least one agent, real-time statistics for the particular site, the real-time statistics comprise a number of total agents, a number of agents scheduled, a number of agents clocked-in, a number of working agents, a number of agents who are inactive on a switch, a number of agents who are working but not scheduled, a number of agents who are working a wrong skill, a percentage of agents in adherence, and a number of agents out of adherence;
   wherein the display of details for the particular skill of the at least one agent comprises details of the at least one agent for the particular skill, and wherein the details comprise an adherence state, a reason for being out of adherence, an adherence percentage, a working skill, a scheduled skill, and a clocked in state;
   wherein the reason for being out of adherence comprises a number of agents inactive on the switch, working but not scheduled, working and schedule mismatch, working the wrong skill, clocked in but not working and not scheduled, on break but working, at lunch but working and clocked out but scheduled; and
   the web application server, refreshing the at least one view with updated events and data wherein refreshing comprises periodically fetching the events and data from the phone router, including a change to at least one of the phone skill name that the agent is currently taking calls for and a change to the phone state of the agent;
   wherein refreshing the at least one view with the updated events and data further comprises: fetching the time keeping data from the time keeping system twelve times an hour; and fetching the events and data from the scheduling system and the at least one phone router four times an hour.

16. The system of claim 15, wherein the at least one phone router is one of an agent phone router.

17. A non-transitory computer readable storage medium comprising instructions that, when executed by a processor, perform:
   collecting, by a web application server of a real-time monitoring system, events and data for an agent from a scheduling system;
   collecting, by a server of the real-time monitoring system, events and data for the agent from at least one phone router wherein the at least one phone router comprises a phone skill name that the agent is currently taking calls for and comprises a state of the agent's phone at that time, the state of the agent's phone comprising active or inactive on the at least one phone router, the phone skill name comprising a skill name the agent is currently working;
   collecting, by the web application server of the real-time monitoring system, time keeping events and data from a time keeping system, the time keeping data comprising clocked-in time, clocked-out time, lunch time and break time, the time keeping events comprising whether the agent is out on break, on lunch or sick;
   normalizing the events, data, the time keeping data and generating normalized data and at least one user interface comprising the normalized data, by a server side process of the real-time monitoring system;
   wherein the at least one user interface is one of a staff application user interface and a desktop application user interface;
   providing the normalized data to a message broker of the real-time monitoring system;
   presenting, by the message broker, at least one view of the at least one user interface to one of the staff application user interface and the desktop application user interface;
   wherein the at least one view comprises: at least one level of display, wherein the at least one level of display includes a display of details across a plurality of sites, a display of details for a particular site, a display of details for a particular skill, and a display of details for a particular agent;
   wherein the display of details for the particular site comprises details of at least one agent in the particular site, wherein the details comprises an adherence percentage, a reason for not being in adherence, a working skill of the at least one agent, a scheduled skill of the at least one agent, a time clock state of the at least one agent, realtime statistics for the particular site, the real-time statistics comprise a number of total agents a number of agents scheduled, a number of agents clocked-in, a number of working agents, a number of agents who are inactive on a switch, a number of agents who are working but not scheduled, a number of agents who are working a wrong skill, a percentage of agents in adherence, and a number of agents out of adherence;

wherein the display of details for the particular skill of the at least one agent comprises details of the at least one agent for the particular skill, and wherein the details comprise an adherence state, a reason for being out of adherence, an adherence percentage, a working skill, a scheduled skill, and a clocked in state;

wherein the reason for being out of adherence comprises a number of agents inactive on the switch, working but not scheduled, working and schedule mismatch, working the wrong skill, clocked in but not working and not scheduled, on break but working, at lunch but working and clocked out but scheduled; and refreshing the at least one view with updated events and data wherein refreshing comprises periodically fetching the events and data from the phone router, including a change to at least one of the phone skill name that the agent is currently taking calls for and a change to the phone state of the agent;

wherein refreshing the at least one view with the updated events and data further comprises: fetching the time keeping data from the time keeping system twelve times an hour; and fetching the events and data from the scheduling system and the at least one phone router four times an hour.

* * * * *